United States Patent [19]

Dämmig

[11] 4,023,723
[45] May 17, 1977

[54] APPARATUS FOR BREAKING STRIPS FROM PLATES, PARTICULARLY FROM PLATES OF CHEWING GUM

[75] Inventor: Werner Dämmig, Furth, Germany

[73] Assignee: Maschinenfabrik Loesch GmbH, Forchheim, Germany

[22] Filed: June 27, 1975

[21] Appl. No.: 591,068

[30] Foreign Application Priority Data

July 12, 1974    Germany ............................ 2433547

[52] U.S. Cl. ................................. 225/97; 225/96.5; 225/103
[51] Int. Cl.² ....................................... B26F 3/00
[58] Field of Search ................. 225/2, 4, 5, 93, 94, 225/96, 96.5, 97, 103, 104; 53/123; 198/24; 83/349

[56] References Cited

UNITED STATES PATENTS

| | | | |
|---|---|---|---|
| 2,141,574 | 12/1938 | Wamser | 83/349 X |
| 2,453,805 | 11/1948 | Melhorn | 225/104 X |
| 2,648,419 | 8/1953 | Detrez | 198/24 |
| 2,652,788 | 9/1953 | Schoppee | 225/103 X |
| 2,931,151 | 4/1960 | Simeone et al. | 225/103 X |
| 3,099,375 | 7/1963 | Schoppee et al. | 225/97 |

*Primary Examiner*—Frank T. Yost
*Attorney, Agent, or Firm*—Cushman, Darby & Cushman

[57] ABSTRACT

The pre-grooved plates e.g. of chewing gum are advanced over a stationary breaker edge into the path of a rotating, polygonal (preferably triangular) breaker shaft whose apices form breaker edges which rotate past the stationary breaker edge. Each facet of the shaft is provided with a stop positioned to be engaged by the leading edge of the advancing plate. The distance across a facet from the respective stop to the respective rotating breaker edge is equal to the width of a strip to be broken from the plate at the next groove in the plate. The axis of rotation of the breaker shaft is transversally displaced from the level of the plate, by an amount sufficient to provide the rotating breaker edge, at the site where the breaking occurs, a velocity component in the direction of advance of the plate which approximately matches the velocity of advance of the plate. Accordingly, the advance and rotary breaking may proceed continuously.

The strip which has been broken off is moved by the respective facet, transversally, to a strip support virtually parallel to the position of the strip at the moment of break and is then transferred from the strip support to a packaging machine before the respective rotating breaker edge has rotated to the level of the strip support.

4 Claims, 2 Drawing Figures

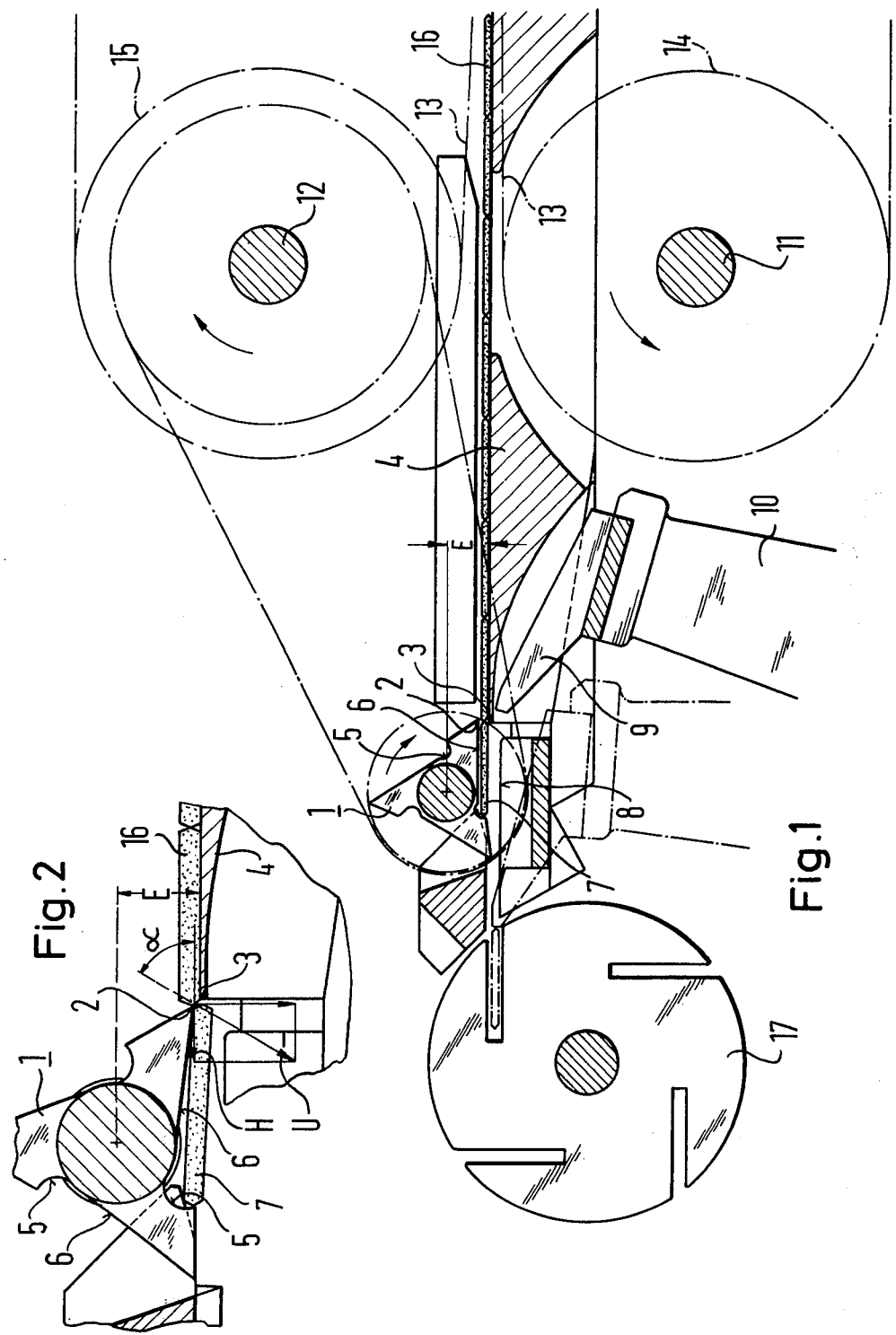

APPARATUS FOR BREAKING STRIPS FROM PLATES, PARTICULARLY FROM PLATES OF CHEWING GUM

FIELD OF THE INVENTION

This invention relates to apparatus for breaking off strips. The apparatus is particularly intended to break strips of chewing gum from plates of chewing gum, which have previously been formed with grooves on both sides. The apparatus may be used also to break strips from plates of different materials and it will be sufficient if the plates have previously been grooved on one side.

BACKGROUND OF THE INVENTION

A known apparatus for breaking strips from plates comprises a horizontal conveyor, which advances previously grooved plates in continuous succession, without intervening gaps, on a support, against a stop which is spaced behind the rear end of the support by the width of one strip. As a result, the strip which engages the stop is no longer supported by the support. A breaker hammer which is vertically movable up and down is provided at this point of the apparatus. When the hammer is in its upper or rest position over the plane of the plates being advanced, the conveyor can advance said plates as far as to the stop. As the hammer descends it breaks one strip from the plate. In this operation the forward end of the support acts as a breaker edge. Below the breaker hammer the strip which has been broken off falls on a second support. A rocker lever is provided to feed the broken-off strip from the second support to a packaging machine. Only when the subsequent upward movement of the breaker hammer has been completed can the plate be further advanced against the stop by the width of one strip.

In this known apparatus, the conveyor for advancing the plates to be broken consists of a chain belt conveyor and is continuously driven. Nevertheless, the plates are intermittently advanced. There is a frictional contact between the plates being advanced and the belt chains of the conveyor and said frictional contact must be selected to permit of a slip when the plates are arrested so that the belt chains can move along the plates without damage. Besides, the belt chains must be capable of accelerating the plates sufficiently for their continued advance against the stop. Owing to these circumstances, the output of that known apparatus is limited to about 900 strips broken off per minute. Besides, the belt chains become soiled with plate material as they move along the arrested plates and the plates become correspondingly depleted.

Another known apparatus also comprises a belt chain conveyor which advances an uninterrupted succession of plates that have previously been grooved on both sides. The strips are broken off by two rolls, which mesh like ratchet teeth. In this apparatus the plates are broken while being advanced at constant velocity. When a plate has been broken, flights of a first chain-conveyor extend from below into the gaps between the stips which have been broken off and move these strips further apart to a certain extent. Flights of a second chain conveyor extend subsequently from above into the resulting gaps and further increase the spaces between the strips. These increased spaces are required so that a rocker lever can extend from below between adjacent strips at the end of the conveyor and can deliver individual strips to a packaging machine. This known apparatus has the advantage that the plates are advanced at constant velocity and the strips broken off are only slightly accelerated by the chain conveyors until the strips are engaged by the rocker lever and by the latter are delivered to the packaging machine. On the other hand, this known apparatus has the disadvantage that the chain conveyors which succeed the breaker rolls constitute open chain drives, which must operate under extremely unfavorable conditions. The powdered sugar, corn starch or the like which is required in the production and processing of plates of chewing gum results in a considerable soiling of the chains and require those chains which move closely adjacent to the edible strips to be virtually dry. Because they cannot be greased, there results a high wear of these chains.

In a third known apparatus, the plates are advanced in the manner described last, i.e., continuously, and the individual strips are broken off by being torn off. For this purpose the plate travels between positively interengaging pairs of rolls. These pairs of rolls have different peripheral velocities so that the strips are torn off between the rolls at the lines which have been weakened by the grooves. This known apparatus has the disadvantage that succeeding further pairs of rolls are required to increase the spaces between the strips to such an extent that their advance can be matched to the cycles of the rocker lever which delivers the strips to the packaging machine.

SUMMARY OF THE INVENTION

It is an object of the invention to simplify apparatus which is of the known kind defined first hereinbefore and thus to ensure a higher output rate and particularly a continuous movement of the plates to be broken.

This is accomplished according to the invention in that the breaker tool is constituted by a single multi-faceted, multi-cornered breaker shaft, that a stop which is engageable by the leading end of the advancing plate is provided in each facet of the breaker shaft and is spaced from the associated breaker edge by a distance which is equal to the width of a strip, that each facet of the breaker shaft is preferably recessed between its stop and the associated breaker edge and that the axis of the breaker shaft is spaced from the plate support for the advancing plates by a distance which is selected so that the tangent to that point of the path of the breaker edge of the breaker shaft which is nearest to the stationary breaker edge of the plate support includes with the horizontal such an acute angle that during a rotation of the breaker shaft at a predetermined speed a velocity component in the horizontal direction (assuming this to be the direction of travel of the plates) becomes effective at the breaker edge of the breaker shaft, which velocity component is approximately as large as the velocity of travel of the plates.

When the breaker edge of the breaker shaft has broken a strip from the advancing plate, the free leading edge of the plate can immediately continue its movement over the breaker edge of the plate support and above the further descending breaker edge of the breaker shaft and can thus move into the space below and behind the next downwardly approaching breaker edge of the breaker shaft. It is apparent that the continuous advance imparted to the plate by a conveyor need not be interrupted or substantially delayed, and the leading edge of the plate can be moved at a virtually constant speed of travel against the stop of the breaker shaft. In this way, the next groove in the plate reaches the correct position for a breaking operation. The strip to be broken off then engages the facet of the breaker shaft so that the breaker edge of said shaft becomes effective immediately thereafter and the strip which has been advanced against the stop is thus broken off at the stationary breaker edge of the plate support.

This arrangement enables a continuous operation at a high rate and almost avoids decelerations and accelerations of the advancing plate. The results of tests which have been carried out suggest that an output above 1500 strips per minute can be sustained.

The advancing plates are continuously advanced into the breaking device at their speed of travel, virtually without deceleration or acceleration. For this reason, the engagement between the feeding coveyor and the plate takes place always under the same velocity conditions. The strip which has been broken off is moved downwardly virtually parallel to itself from the feeding plane by the side face of the breaker shaft to the strip support and is then moved from the strip support to the packaging machine by the rocker lever. The strip which has been broken off is thus removed from the strip support before the breaker edge of the breaker shaft has descended to the level of the strip support.

Particularly desirable geometric relations will be obtained if the breaker shaft is three-cornered so that the next breaker edge will become effective after a rotation of 120°. In this case it is relatively easy to ensure that the horizontal velocity component of the strips which have been broken off is approximately as large as the velocity at which the plate is advanced.

An embodiment of the invention will now be described with reference to the drawing.

BRIEF DESCRIPTION OF THE DRAWING

In the drawing

FIG. 1 is a diagrammatic longitudinal sectional view showing the breaking device in operation, breaking strips from pre-grooved plate.

FIG. 2 is a fragmentary enlarged view showing the central portion of the breaking device of FIG. 1.

DETAILED DESCRIPTION

Shafts 11 and 12 are operated to drive chain sprockets 14 and 15 continually in the direction indicated by the arrows. Belt chains 13 are trained around these chain sprockets. Plates 16, for instance of chewing gum, are disposed between the tensioned parts of these chains. Each of the plates 16 have previously been formed with a plurality evenly spaced grooves, which extend transversely to the direction of travel. The belt chains 13 advance the plates 16 to a breaker shaft 1. As the velocity of the belt chains exceeds the velocity required to advance the plates 16, there is always a certain slip between the chains 13 and the plates 16 and the plates 16 are always reliably fed to the breaker shaft and any gaps which may form between the respective trailing and leading edges of serially adjacent plates will be closed.

The transverse cross-section of the breaker shaft 1 and the breaking operation are clearly apparent from FIG. 2. The breaker shaft 1 is polygonal, preferably three-cornered, and in this case has in transverse cross-section substantially the configuration of an equilaterial triangle. Breaker edges 2 are formed by the apices of the triangle.

It is apparent from FIGS. 1 and 2 that the plate 16 which is advanced under the breaker shaft 1 engages a respective stop 5 one of which is formed in each side face or facet 6 of the breaker shaft. This side face 6 is recessed between the stop and the associated breaker edge. The distance between the stop 5 and the associated breaker edge 2 is as large as the width of a desired strip so that a groove of the plate 16 will be disposed directly under the breaker edge 2 when the plate 16 engages the stop 5. The advancing plate 16 lies on a plate support 4, which has at its free forward end a stationary breaker edge 3. A breaker edge 2 of the rotating breaker shaft 1 is disposed opposite to the stationary breaker edge 3 at the instant in which a strip is broken off.

As the breaker shaft 1 rotates in the direction indicated by the arrow, that side face 6 of the breaker shaft 1 which is disposed between the breaker edge 2 and the stop 5 forces a strip 7 of the plate 16 downwardly, breaking said strip from the plate 16. When the breaker edge 2 then moves past the opposite breaker edge 3 of the plate support 4, the plate 16 continues its advance above the breaker edge 2, which descends further. The plate 16 then engages the stop 5 on the descending next side face 6 of the breaker shaft 1.

The strip 7 which has been broken off reaches a strip support 8, which is parallel to the plate support 4 and disposed under the breaker shaft 1. The strip support 8 is comb-like just as is the breaker shaft 1 so that the breaker edges 2 of the latter can move through the strip support, in an interdigitating manner as is apparent from FIG. 1. Before a given breaker edge 2 of the breaker shaft 1 moves through the support 8, the strip 7 which has been broken off by said breaker edge is pushed off to the left in FIG. 1 by a similarly comb-like projecting ledge 9 of a rocker lever 10, to enter the slotted drum 17, which constitutes the first station of a packaging machine. The latter is not shown in further detail.

As is apparent from FIGS. 1 and 2 the rotational axis of the breaker shaft 1 is spaced by a distance E above the level of the upper surface of the plate support 4. Accordingly, the tangent to that point of the path of the breaker edge 2 which is nearest to the cooperating breaker edge 3 is not vertical, but includes with the horizontal an acute angle $\alpha$, which depends on the distance E. As a result, a velocity which is equal to the peripheral velocity U of the breaker edge 1 is imparted to the trailing edge of the strip 7 which has been broken off between the breaker edges 2 and 3. At the breaking nip, the peripheral velocity U has a horizontal velocity component H, which is almost as large as the velocity at which the plates 16 advance if the diameter of the breaker shaft 1 is properly selected. As a result, the velocity at which the plates 16 advance can be held virtually constant throughout the encounter of the plates 16 with the breaking device. As a further result, the strip 7 which has been broken off is accelerated and is moved downwardly parallel to itself and onto the strip support 8, from which it can be pushed away by the projecting ledge 9 of the rocker lever 10 before the breaker edge 2 reaches the level of the strip support 8.

It is apparent from the drawing that the axis of rotation of the breaker shaft is parallel to the grooves in the plates 16 and parallel to the stationary breaker edge 3 of the plate support 4. The bearings and drive means associated with the breaker shaft 1 are dust-tight to fulfill the requirements to be met in the processing of edible products.

Tabulation of typical values for the purpose of illustration:

| Parameter | Typical values |
| --- | --- |
| Breaker shaft diameter through apex | 30 mm |
| Breaker shaft rotations/unit time | 400/min |
| Speed of advances of plates | 380 mm/sec |
| Closest approach of 2 to 3 | approximately 0,5 mm |
| Strip width | 19 mm |
| Strip thickness | 2 mm |
| E | 7,5 mm |
| α | 25° |
| H | 260 mm/sec |
| U | 615 mm/sec |

It should now be apparent that the apparatus for breaking strips from plates, particularly from plates of chewing gum as described hereinabove, possess each of the attributes set forth in the specifications under the heading "Summary of the Invention" hereinbefore. Because the apparatus for breaking strips from plates, particularly from plates of chewing gum can be modified to some extent without departing from the principles of the invention as they have been outlined and explained in the specification, the present invention should be understood as encompassing all such modifications as are within the spirit and scope of the following claims.

I claim:
1. Apparatus for breaking off strips from the leading edge portion of an advancing plate, for instance of chewing gum, along succeeding transversally extending, longitudinally equally spaced lines of weakness performed in at least one face of the plate, comprising:
    a stationary plate support surface having a transversally extending leading edge;
    means for continuously advancing the plate along the support surface to displace more of the leading edge portion of the advancing plate past the leading edge of the support surface;
    a single rotating breaker shaft which is generally polygonal in transverse cross-section, so as to have a plurality of side faces interspersed angularly of the shaft with a plurality of breaker edges, the shaft being disposed in proximity to the leading edge of the support surface so that, as the shaft rotates a nip is periodically formed between the leading edge of the support surface and succeeding edges of the breaker shaft;
    each breaker shaft side face having a stop defined by a recess between successive breaker edges, the distance between each stop and a respective rotationally trailing breaker edge being substantially equal to the width of each strip to be broken from the advancing plate;
    the axis of rotation of the breaker shaft being so transversally displaced from the level of the leading edge of the support surface as to produce the following relation:
    as the leading edge of the plate engages a respective stop and the rotationally trailing breaker edge produces a nip with the leading edge of the support surface resulting in the shearing of the plate along the respective performed line of weakness of the plate, this breaker edge has a velocity component in the longitudinal direction of the advancing plate that is approximately as large as the velocity of the advancing plate; and
    means for removing the successively formed strips from the vicinity of the breaker shaft.

2. The apparatus of claim 1, wherein:
    the stationary support surface is generally horizontal and upwardly facing;
    the displacement of the rotary axis of the breaker shaft is above the support surface by a distance which is selected so that the tangent of the path of the breaker edges where they most closely approach the leading edge of the support surface includes an acute angle with the horizontal, so that each strip, when severed is moved forwardly and downwardly at a velocity which permits the continued advance of the plate at a virtually constant velocity.

3. The apparatus of claim 1, further comprising:
    a stationary strip support;
    both the apex portions of the breaker shaft and the strip support being of comb-like construction, the strip support being disposed under the breaker shaft but so close as to periodically interdigitate with the apex portions of the breaker shaft;
    the means for removing the successively formed strips from the vicinity of the breaker shaft being constituted by a periodically oscillated rocker lever arranged to push a strip off the strip support between when a strip is broken from the plate and advanced onto the strip support and when the apex portion containing the respective rotationally trailing breaker edge moves interdigitatingly through the strip support.

4. The apparatus of claim 1, wherein:
    the breaker shaft is of generally triangular, three-sided, three-edged construction.

* * * * *